May 21, 1963

E. A. ASH 3,090,886

ELECTRIC WAVE GENERATORS

Filed June 6, 1960

Inventor

E.A. Ash

By [signature]

Attorney 3,090,886

ELECTRIC WAVE GENERATORS

Eric Albert Ash, London, England, assignor to International Standard Electric Corporation, New York, N.Y.
Filed June 6, 1960, Ser. No. 34,088
Claims priority, application Great Britain July 3, 1959
7 Claims. (Cl. 315—3.6)

The present invention relates to travelling wave oscillation generators and to travelling wave oscillator tubes therefor.

It is a well known fact that backward wave oscillators (BWO) are inherently less efficient than travelling wave amplifiers (TWA). The reason for this is that, whereas in the TWA the current and field maxima occur at the same (electron collector) end of the tube, in the case of the BWO the current maximum occurs at the collector end and the field maximum at the electron gun end of the tube. The efficiency of the interaction is thereby adversely affected. Although it is possible to convert a conventional travelling wave amplifier into an oscillation generator by feeding back via an external coupling, at the shorter wave lengths (say below 4 mm.) such feedback loops are difficult to construct, and are likely to introduce power losses which can be ill-afforded.

It has previously been suggested to combine a BWO and a TWA using the same slow wave structure but two oppositely directed electron beams, one beam exciting oscillations of a backward spatial harmonic mode of the slow wave structure and the other amplifying a forward mode of propagation at the frequency of the backward wave oscillations.

In the present invention a backward wave oscillator and a travelling wave amplifier are combined, but the BWO electron beam and the TWA beam both travel in the same direction and may, in fact, be subdivisions of the same electron stream. Two slow wave structures are coupled together throughout the length of interaction with the electrons, the structures being differentiated from one another in that, at the desired output frequency, one structure propagates a backward mode and the other a forward mode. Preferably use is made of a slow wave structure which comprises, basically, a pair of conducting side walls joined throughout their length in a plane normal to the walls by a grating, which grating may be regarded as an array or arrays of elementary resonators. In one such arrangement, the grating consists of a conducting sheet apertured by similar parallel slots which are oblique to the side walls and do not extend the full width between them; to form a slow wave structure two such gratings are joined between the side walls one above the other. This double sheet slow wave structure, and others in which the gratings are arrays of coupled elementary resonators, together with a certain single sheet modification in which the bars of the grating are arranged in two sets, oppositely inclined to the side walls and joined at their ends, have been found to exhibit both forward and backward fundamental modes of wave propagation.

In the preferred embodiments of the invention, therefore, an additional grating is used in such manner that, for example, three gratings form, between them, two pairs, each pair together with the side walls propagating a slow wave, one pair in the fundamental forward mode, and the other in the fundamental backward mode at the same frequency and with the same phase velocity.

An electron beam projected from end to end of the pair of slow wave structures with the electrons having velocities equal to the common phase velocity of the slow wave structures, sets up backward wave oscillations in one structure and amplifies the forward mode of the same frequency which is impressed, due to the common coupling on the forward propagating structure. For neighbouring frequencies, at which the phase velocities along the two slow wave structures are not quite the same, operation according to the invention can be obtained by corresponding small adjustments to the respective beam velocities.

The invention will be further described with reference to the accompanying drawings, in which.

Figure 1:
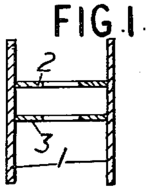
FIG. 1 illustrates a transverse cross-section through a double sheet slow wave structure utilised in preferred embodiments of the invention.
Figure 2:
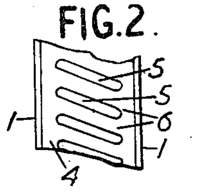
FIG. 2 illustrates a slotted type of grating for use in the slow wave structure of FIG. 1.

In the slow wave structure of FIG. 1, a pair of parallel conducting surfaces, or side walls, 1 extends along the length of the structure and is joined throughout that length by gratings 2 and 3 lying in parallel planes normal to the side walls. One suitable form of grating is illustrated in FIG. 2 and comprises a conducting sheet 4 apertured by parallel slots 5 oblique to the side walls. The webs 6 between the slots can be regarded as half wave resonators which are coupled together, in the arrangement of FIG. 1, so that there is an asymmetry between the electric and magnetic field couplings between adjacent resonators, thus allowing wave propagation over a band of frequencies. The slow wave structure so formed has been found to have strong spatial harmonics, but also both forward and backward fundamental modes of propagation.

Figure 3:
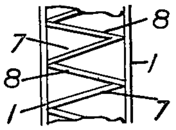
FIG. 3 illustrates a mesh type of grating, a single sheet of which may replace the two sheets of FIG. 1.

The grating shown in FIG. 3 comprises two sets of parallel conductors 7 and 8 respectively, the sets being equally and oppositely inclined to the side walls 1 and joined together at the junctions with the side walls. A single sheet of grating of FIG. 3 can replace the pair of gratings 2 and 3 of FIG. 1 to form a slow wave propagating structure of relatively large band width.

Although there are many variants of both the double sheet and single sheet slow wave structures of FIGS. 1 to 3, preferred grating patterns, such as illustrated in FIGS. 2 and 3, exhibit both forward and backward fundamental modes of wave propagation. This is illustrated in FIG. 4.

Figure 4:
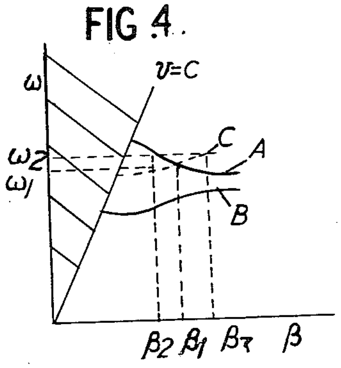
FIG. 4 is a Brillouin plot illustrating the dispersion characteristics of the slow wave structures utilised in embodiments in the invention.

FIG. 4 shows a Brillouin plot typical of slow wave structures using gratings such as those of FIGS. 2 or 3. In this diagram the angular frequency $\omega$ is plotted as a function of the propagation phase constant $\beta$. The propagation constants of structures which it is preferred to use in the present invention are typically illustrated by the curves A and B, which relate to different fundamental modes. At any given frequency the phase velocity of wave propagation is given by the ratio $\omega/\beta$ at a given point on the graph; the group velocity is given by $d\omega/d\beta$ at this point. A perfectly dispersionless all-pass structure would have phase and group velocities equal to the velocity of light and is represented on the Brillouin plot by the line labelled $v=c$, $v$ being phase velocity and $c$ the velocity of light. The dispersion curves A and B extend to the left of the diagram as far as their intersection with the line $v=c$, beyond which there is a "forbidden" region shown hatched; this intersection thus gives the lower cut-off frequency of the mode being considered. In curve B the slope is always positive, i.e. the group velocity and phase velocity are similarly directed and the curve relates to a fundamental forward mode of propagation. For the curve A, however, the slope is negative, which means that the group velocity is oppositely directed to the phase velocity, i.e. curve A represents a fundamental backward mode of propagation. If, now, electrons are projected along a structure whose dispersion characteristics are represented by the curves A and B, the electrons having velocities approximately the same as the phase velocity $\omega/\beta$, backward wave oscillations will be set up if there is a corresponding point on the curve A. If now the curve B is shifted to the position of the dotted curve C, leaving curve A relatively undisturbed, then, for operation at the point of intersection $(\omega_1\beta_1)$, not only will the backward wave oscillations be set up, but the electrons provide amplification in the forward mode; this is the principle of operation of the present invention.

Figures 5, 6:
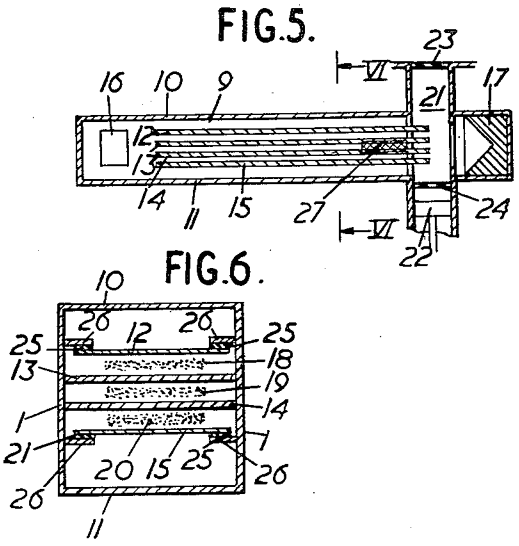
FIG. 5 is a diagrammatic illustration in longitudinal section of an oscillator tube according to the invention.
FIG. 6 is a diagrammatic representation of a cross-section in the plane VI—VI of FIG. 5.

Referring now to FIGS. 5 and 6, a multiple slow wave structure, based on FIG. 1, is indicated at 9. The two side walls 1 are made side walls of a rectangular envelope of metal whose upper and lower walls, 10 and 11, respectively, are sufficiently far removed from gratings 12 to 15 so as not to affect the operation of the slow wave structure. Gratings 13 and 14 are similar and may be of the slotted type illustrated in FIG. 2, so together forming a slow wave structure as described with reference to FIG. 1. Gratings 12 and 15, similarly disposed above and below 13 and 14, respectively, provide two further slow wave structures of similar characteristics, namely, one structure between the gratings 12 and 13 and the other between gratings 14 and 15. Gratings 12 and 15 differ from 13 and 14 in that, for example, the slots 5 (FIG. 2) are elongated so that if the backward wave characteristic of the pair 13 and 14 is represented by the curve A of FIG. 4 then the forward fundamental mode of the pairs 12 and 13 and 14 and 15 are represented by the curve C.

An electron gun is indicated purely diagrammatically by the rectangle 16 in FIG. 5; it is arranged, in conjunction with suitable polarisation applied to the gratings 12 to 15, to project a beam of electrons along the composite structure 9 to an electron collector electrode 17. For some applications it will be sufficient merely to flood the structure 9 by the beam, but in others, it may be desirable to subdivide the beam into three parts or to use three separate electron guns. In FIG. 6 three separate electron beams 18, 19 and 20 are indicated. Assuming for the moment that the electron velocities are adjusted to equal the phase velocity $\omega_1\beta_1$ corresponding to the point of intersection of curves A and C of FIG. 4, the beam 19 will set up backward wave oscillations in the slow wave structure consisting of the gratings 13 and 14 together with the side walls 1. The wave energy on the slow wave structure will increase from adjacent the electron collector end of the tube towards the electron gun end. Some of this energy will couple through to the slow wave structures formed between the gating pairs 12, 13 and 14, 15 and here interaction will occur with the respective beams 18 and 20 which will cause amplification in the forward mode corresponding to the curve C of FIG. 4. The amplified waves will therefore grow as they progress from the electron gun end of the tube towards the electron collector end. At the electron collector end of the structure 9 the gratings are shown in FIG. 5 as projecting into a rectangular waveguide 21, which is provided with an impedance matching plunger 22 and waveguide windows 23 and 24 for completing the hermetic seal of the envelope of the discharge device. Since the backward propagating structure should not be coupled to the waveguide 21, it must be terminated in a reflectionless manner. This termination is indicated by the cross-hatched region 27 in FIG. 5; in practice a coating of lossy material on the sides of gratings 13 and 14 which face one another would suffice.

As so far described, the device of FIGS. 5 and 6 will operate as a combined BWO/TWA at only the one frequency corresponding to angular frequency $\omega_1$ of FIG. 4.

If we consider another frequency $\omega_2$, to obtain the same results it would be necessary to operate at the point $\omega_2\beta_2$ on curve A and the point $\omega_2\beta_3$ on curve C, the phase velocities differing by a small amount, so that coupling between the two wave and beam systems is still effected. This means that the velocity of beam 19 would have to be adjusted to the value $\omega_2/\beta_2$ while that of the beams 18 and 20 would have to be decreased to the velocity $\omega_2/\beta_3$. This can be done quite effectively by adjustment of the voltage applied to the gratings 12 and 15, which, in FIG. 6 are shown to be insulated from the side walls 1 by means of thin strips of insulation 25 interposed between them and flanges 26 projecting from the side walls and to which the gratings 12 and 15 are secured.

In the arrangements of FIGS. 5 and 6 the backward wave structure is coupled on each side to a forward wave structure. It is obvious that, with some loss of efficiency, one of these forward wave structures could be omitted, i.e. it would be possible to operate the tube with the omission of grating 15 and beam 20. Likewise, it would be possible to arrange that gratings 13 and 14 function together in the forward mode with the outer pairs 12, 13 and 14, 15 operating in the backward mode of the propagation.

It has also been assumed, so far, that gratings of the type illustrated in FIG. 2 are used, so that a pair of such gratings is required for each slow wave structure. If, instead, gratings of the type illustrated in FIG. 3 are used, then the composite structure 9 of FIG. 5 could be reduced to the 2-sheet structure of FIG. 1 in which the gratings 2 and 3 were each of the FIG. 3 type, but differing slightly in their dimensions, so as to obtain an intersection on the Brillouin plot of the respective forward and backward modes of propagation of the two structures. Here again with both gratings joined directly to the side walls 1, and a single electron beam between them, BWO/TWA action could occur only at one frequency. Extension of the frequency range of oscillation and amplification would be made possible by insulating one of the gratings 2 or 3 as is done for gratings 12 and 15 of FIG. 6, or, alternatively, providing two electron guns at different cathode potentials, one to flood the grating 2 and the other to flood the grating 3.

It is to be understood that the foregoing description of specific examples of this invention is not to be considered as a limitation on its scope.

What I claim is:

1. A travelling wave oscillator tube comprising a pair of parallel conducting surfaces, a plurality of resonant gratings parallel to one another and each joining the said conducting surfaces throughout a given length in a respective plane normal to the pair of surfaces, the gratings being apertured to form with the said surfaces a plurality of slow wave structures such that there is one structure having a forward mode of wave propagation of a given phase velocity at a given frequency and a second structure coupled to the first having a backward mode of wave propagation of the same phase velocity at the given frequency, electrode means for projecting electrons along the said given length to propagate forward wave oscillations in said first structure and backward wave oscillations in said second structure, said backward wave oscillations in said second structure causing amplification of said forward wave oscillations in said first structure and electrode means for collecting the electrons at the end of the given length, and an output wave feeder coupled to the forward wave propagating slow wave structure at the end adjacent the electron collector electrode means.

2. A travelling wave oscillator tube according to claim 1 in which each grating comprises a sheet of conducting material slotted to form an array of similar resonators.

3. A travelling wave oscillator tube according to claim 2 wherein said plurality of gratings includes a pair of similar adjacent gratings dimensioned for backward wave propagation in the space between them and a further grating forming with one of the gratings of the said pair, a second pair dimensioned for forward wave propagation between them.

4. A travelling wave oscillator tube according to claim 2 wherein said plurality of gratings includes a pair of similar adjacent gratings dimensioned for backward wave propagation in the space therebetween and two further gratings, one on each side of the first mentioned pair, to provide two outer pairs propagating waves in a forward mode.

5. A travelling wave oscillator tube according to claim 2, in which at the said given frequency, the respective phase velocities of the waves propagated by the forward and backward mode slow wave structures differ by a small amount, the tube comprising means for imparting a corresponding difference between the velocities of the electrons which interact with the waves.

6. A traveling wave oscillator according to claim 2 in which the said forward and backward modes of wave propagation are fundamental modes.

7. A travelling wave oscillator tube according to claim 1 wherein each said resonant grating comprises two sets of bars extending between and oppositely inclined to said surfaces, the ends of said oppositely inclined bars being joined at said surfaces.

References Cited in the file of this patent

UNITED STATES PATENTS

| | | |
|---|---|---|
| 2,814,756 | Kenmoku | Nov. 26, 1957 |
| 2,821,652 | Robertson et al. | Jan. 28, 1958 |
| 2,831,142 | Kazan | Apr. 15, 1958 |
| 2,890,373 | Chodorow | June 9, 1959 |
| 2,891,191 | Heffner et al. | June 16, 1959 |
| 2,976,456 | Birdsall et al. | Mar. 21, 1961 |